(12) United States Patent
Yankov et al.

(10) Patent No.: US 10,417,492 B2
(45) Date of Patent: Sep. 17, 2019

(54) CONVERSION OF STATIC IMAGES INTO INTERACTIVE MAPS

(71) Applicant: Microsoft Technology Licensing, LLC, Redmond, WA (US)

(72) Inventors: Dragomir Yankov, Sunnyvale, CA (US); Pavel Berkhin, San Francisco, CA (US); Michael Robert Evans, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 130 days.

(21) Appl. No.: 15/388,635

(22) Filed: Dec. 22, 2016

(65) Prior Publication Data
US 2018/0181807 A1    Jun. 28, 2018

(51) Int. Cl.
| G06K 9/62 | (2006.01) |
| G06K 9/00 | (2006.01) |
| G06K 9/66 | (2006.01) |
| G06T 3/40 | (2006.01) |
| G06T 7/60 | (2017.01) |
| G06Q 10/10 | (2012.01) |
| G09B 29/00 | (2006.01) |

(52) U.S. Cl.
CPC ....... *G06K 9/00476* (2013.01); *G06K 9/6218* (2013.01); *G06K 9/6267* (2013.01); *G06K 9/66* (2013.01); *G06Q 10/10* (2013.01); *G06T 3/40* (2013.01); *G06T 7/60* (2013.01); *G09B 29/003* (2013.01)

(58) Field of Classification Search
None
See application file for complete search history.

(56) References Cited

U.S. PATENT DOCUMENTS

| 8,351,703 | B2 | 1/2013 | Jain et al. |
| 8,825,392 | B2 | 9/2014 | Stroila |
| 9,984,075 | B2 * | 5/2018 | Bakshi ................. G06F 16/435 |
| 10,049,099 | B2 * | 8/2018 | Zhu ..................... G06F 16/3322 |
| 2005/0088544 | A1 | 4/2005 | Wang |
| 2006/0245616 | A1 | 11/2006 | Denoue et al. |
| 2008/0086368 | A1 | 4/2008 | Bauman et al. |

(Continued)

OTHER PUBLICATIONS

"Search by Image—Inside Search—Google", Retrieved from <<https://web.archive.org/web/20160906141658/https://www.google.com/intl/es419/insidesearch/features/images/searchbyimage.html>>, Retrieved on: Feb. 28, 2018, 3 Pages.

(Continued)

*Primary Examiner* — Nancy Bitar
(74) *Attorney, Agent, or Firm* — Merchant & Gould

(57) ABSTRACT

The present disclosure is directed to systems, methods and devices for replacing a static map image with an interactive map that approximates the geographic area depicted by the static map image. A static image may be inspected and a determination may be made as to whether the static image meets a map identification threshold value. At least one signal associated with the static image may be evaluated and based on that evaluation at least one geo-entity of intent may be identified. The static image may be replaced with a static image corresponding to at least one of the identified geo-entities of intent.

20 Claims, 13 Drawing Sheets

(56) References Cited

U.S. PATENT DOCUMENTS

| | | | | |
|---|---|---|---|---|
| 2011/0191014 | A1* | 8/2011 | Feng | G01C 21/00 |
| | | | | 701/532 |
| 2013/0083056 | A1* | 4/2013 | Chow | G06T 11/206 |
| | | | | 345/629 |
| 2014/0278060 | A1 | 9/2014 | Kordari et al. | |
| 2014/0380178 | A1* | 12/2014 | Kapahi | G06F 3/0488 |
| | | | | 715/738 |
| 2015/0055857 | A1* | 2/2015 | Wang | G06K 9/18 |
| | | | | 382/165 |
| 2015/0187098 | A1 | 7/2015 | Ofstad et al. | |
| 2016/0140147 | A1* | 5/2016 | Sun | G06F 16/5838 |
| | | | | 707/772 |
| 2016/0267128 | A1* | 9/2016 | Dumoulin | G06F 16/243 |

OTHER PUBLICATIONS

Evans, et al., "LiveMaps—Converting Map Images into Interactive Maps", In Proceedings of the 40th International ACM SIGIR Conference on Research and Development in Information, Aug. 7, 2017, 4 Pages.

Harley, et al., "Evaluation of Deep Convolutional Nets for Document Image Classification and Retrieval", In 13th International Conference on Document Analysis and Recognition, 2015, Aug. 23, 2015.

"International Search Report and Written Opinion Issued in PCT Application No. PCT/US2017/066232", dated March 13, 2018, 13 Pages.

Desai, et al., "Automatically Identifying and Georeferencing Street Maps on the Web", In Proceedings of 9th Workshop on Geographic Information Retrieval, Nov. 4, 2005, 4 pages.

Decorah, Katy, "Google Static Map Maker", http://staticmapmaker.com/google/, Oct. 17, 2016, 2 pages.

Cassandro, Massimo, "Getting Started with Google Maps Recipes", https://www.sitepoint.com/getting-started-google-maps-recipes/, Nov. 20, 2014. 10 pages.

Slawski, Bill, "Google on Reading Text in Images from Street Views, Store Shelves, and Museum Interiors", hittp://www.seobythesea.com/2008/01/google-on-reading-text-in-images-from-street-views-store-shelves-and-museum interiors/, Jan. 3, 2008, 14 pages.

"About Terrapattern", http://www.terrapattem.com/about, Oct. 17, 2016, 16 pages.

"Aaccessmaps—bayarea", http://www.aaccessmaps.com/images/maps/us/ca/bayarea/bayarea.jpg, Oct. 25, 2016, 1 page.

"How many places are named Fremont?", http://us.geotargit.com/called.php?qcity=Fremont, Oct. 25, 2016, 2 pages.

* cited by examiner

CONVERSION OF STATIC IMAGES INTO INTERACTIVE MAPS

BACKGROUND

Websites and applications often contain static map images that users may consult for various reasons. Alternatively, interactive maps provide useful tools that users can interact with. Users may wish to utilize interactive map tools that allow them to zoom in or out on a map, access traffic information on areas contained on a map, view information about places of interest contained on a map, etc. These tools are not available on static map images; to utilize such features, users must manually access an interactive map service, perform a search related to a static map image of interest on an originating website or application, and manually hone the area of the searched for map to correspond to the location displayed in the static map image of interest.

Additionally, although relatively specific problems are discussed, it should be understood that the aspects should not be limited to solving only the specific problems identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods and devices for converting static images into interactive maps. A static image may be inspected and a determination may be made as to whether the static image likely corresponds to a static map image. Potential geo-entities of intent may be identified from a static map image, and one or more geo-areas of intent may be identified for replacing the static map image. One or more filters may be applied to reduce potential geo-entities and/or potential geo-areas of intent. A replacement map viewport area may be determined. The original static map image may be replaced with an interactive map corresponding to an identified most likely geo-area of intent.

DETAILED DESCRIPTION

Figure 1:
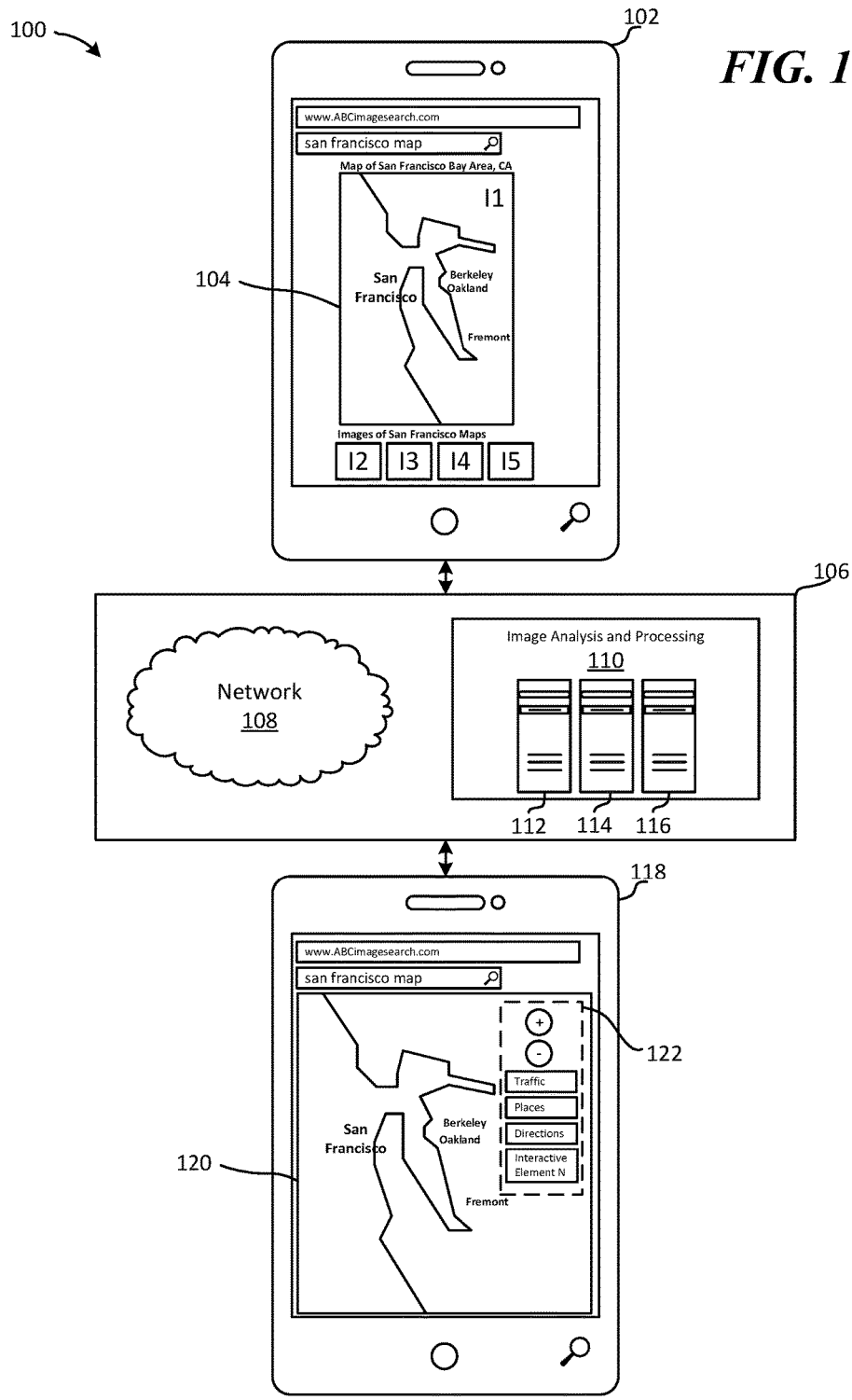
FIG. 1 is an exemplary schematic diagram of an environment for replacing a static map image with an interactive map that approximates the geographic area depicted in a static map image.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems, methods and devices for converting static map images into interactive maps. Static map images, as used herein, refer to images of geo-entities (neighborhoods, cities, states, countries, etc.) that have very little, if any, interactive functionality. That is, static map images are generally limited to pixel elements that depict one or more geo-entity, and a corresponding geo-area, as a map. Alternatively, interactive maps, as used herein, refer to maps that are integrated with interactive tools that users may utilize to perform actions such as zooming in or out, accessing traffic information, view information about places of interest, etc.

Static map images are commonly associated with websites and applications that users access, yet the user-interaction that can be accommodated by such maps is extremely limited (e.g., a user may be able to enlarge a static map image resulting in blurred pixel imagery). The functionality accommodated by static map images is unintuitive and often leads to poor user experience. For example, if a user clicks on a static map image on a website, the user may be directed to a source website that hosts the static map image, which may or may not provide additional information that is helpful for the user's intended purpose. Should a user desire to interact at a higher level with a geo-location depicted in a static map image, that user would typically need to manually access an interactive map service, perform a search related to a static map image of interest on an originating website or application, and manually hone the area of the searched for map to correspond to the location displayed in the static map image of interest. Only upon performing such steps would the user be provided with interactive functionality for a geo-location corresponding to an area provided by the original static map image.

The current disclosure provides mechanisms for converting static map images to interactive maps by way of little or no user interaction. According to examples, a static map image may be automatically replaced with an interactive map corresponding to a geo-entity depicted by a static map image, a link to an interactive map corresponding to a geo-entity depicted by a static map image may be provided, and/or a popup tooltip may be provided that links to an accurate interactive map corresponding to a static map image when a cursor is hovered over a static map image.

According to some aspects, upon detecting that a webpage or accessed application contains an image, that image may be analyzed and inspected and a determination may be made as to whether that image depicts a geo-entity map (i.e., a static map image). In inspecting the image, machine learning may be implemented to detect whether the image is a geo-entity map. For example, one or more convolutional neural networks trained to detect and classify images by image type and category may be utilized to determine whether an input image corresponds to a geo-entity map. A map identification threshold value may be implemented in confirming whether a static image likely corresponds to, and should be classified as, a geo-entity map. That is, after a static image has been inspected, a calculation may be made regarding the likelihood that the image corresponds to a geo-entity map. A map identification threshold may be implemented such that only images that have been determined to be over a certain likelihood/threshold (e.g., a calculated value of more than X %) of corresponding to a geo-entity map may be further analyzed according to the systems and methods described herein for converting the image to an interactive map.

Upon determining that a static image meets or exceeds a map identification threshold value, and the static image has thus been classified as a static map image, various signals associated with the image may be evaluated to produce an accurate interactive map corresponding to the static map image. Exemplary signals that may be evaluated include text strings contained in a static map image determined by performing optical character recognition analysis of the static map image, the size and/or emphasizing characteristics (e.g., bolding, coloring) of text strings contained in the static map image, text strings related to geo-entities contained in user queries that produced the static map image, text strings related to geo-entities that are adjacent to the static map image, text strings related to geo-entities that are contained in a URL that the static map image is hosted on, and areas of focus in the static map image (e.g., areas that are highlighted in a static map image by coloring, bolding, highlighting), among others.

According to examples, optical character recognition analysis may be performed on a static map image. The text extracted from the static map image by the optical character recognition provides a signal that may be utilized in determining one or more potential geo-entities of intent from the static map image. For example, one or more text strings as determined by optical character recognition may be analyzed and matched against one or more geo-entity databases and/or geo-entity search engines and determinations may be made therefrom that an extracted text string corresponds to one or more geo-entities or geo-entity types (e.g., city, county, state, province, country).

According to additional examples, a plurality of text strings extracted from a static map image by optical character recognition may be analyzed to determine the relative text size of each text string as it relates to other text strings contained in the static map image. Identification of larger fonts may indicate the importance of entities shown on a map and thresholds for relative font size may be utilized in filtering out text strings that likely correspond to smaller geo-entities. Similarly, in the case where computing resources, data transfer resources, and/or time resources are limited, the thresholds for filtering text strings based on relative font size may be modified due to the cost of geocoding a large number of terms.

Text strings extracted from a static map image and/or its adjacent areas (or objects embedded in those areas), as well as text strings contained in user queries, URLs that produce and link to a static map image, and attribute alternative text that describes a static image, may be analyzed for relevance to a geo-entity. For example, a value/weight may be placed on an extracted textual signal from a static map image regarding the likelihood that a geo-location associated with that text string is a geo-entity of intent for a user. According to a more specific example, if a webpage contains an image that has been determined to be a static map image, and text extracted from an area surrounding that static image (e.g., "San Francisco Bay Area" located adjacent to, but outside of a viewport for, an embedded static map image) has been determined to correspond to a geo-location, that determination can be used, alone or in combination with other signals, to calculate one or more areas of geo-intent or potential areas of geo-intent.

Areas of focus for a static map image may be evaluated as being indicative of a potential geo-area of intent. For example, a determination may be made that a static map image contains focus areas identified by shading, color, edge and color differentiation, and a value/weight may be placed on that extracted signal regarding the likelihood that a geo-location associated with an area of focus is a geo-area of intent for a user. For example, static map images often contain colored sections to draw a user's focus towards those areas. In those instances, a determination may be made as to what text strings (or other signals) are provided by a static map image within the confines of the area of focus and filters may be applied to reduce or eliminate the impact of other signals outside of the area focus in identifying a geo-entity and/or geo-area of intent.

According to further examples, one or more geo-entity and/or geo-area of intent, including a most likely geo-entity and/or geo-area of intent, may be identified from evaluation of one or more signals associated with a static map image. In the case that multiple signals are evaluated in making this identification, each signal may be weighted. Upon identification of the most likely geo-entity and/or geo-area of intent a static map image may be replaced (or otherwise linked) with an interactive map corresponding to the area depicted by the static map image.

Upon identifying one or more potential geo-entities of intent from a static map image, one or more of those identified potential geo-entities may be filtered prior to performing geocoding (i.e., the process of matching a potential geo-entity to one or more specific locations through a map search engine and/or a map application) due to costs associated with performing the geocoding. For example, an evaluation of one or more signals associated with a static map image of the San Francisco Bay Area may contain text strings of various size and smaller sized text strings may be filtered prior to geocoding. According to another example an area of focus identified from a static map image may evaluated to filter out potential geo-entities that are outside of that area of focus.

Geocoding of the remaining potential geo-entities of intent (after filtering those entities as described above) may be performed. For example, a static map image of the San Francisco Bay Area and its corresponding signals (e.g., non-filtered text strings extracted from the static map image such as "San Francisco", "Oakland", "Fremont", "Berkeley") may be run through a map search engine to determine locational coordinates (e.g., longitude and latitude coordinates) and geo-chain information (e.g., locational hierarchy such as road, neighborhood, city, county, state, country) of one or more geo-entities corresponding to a potential geo-area of intent. For example, a large number of locations around the world corresponding to non-filtered text strings from a static map image of the San Francisco Bay Area may be identified through geocoding of potential geo-entities of intent determined from the static map image (e.g., there may be multiple cities around the world having the names San Francisco, Oakland, Fremont, Berkeley).

Clustering and/or spatial reduction may be performed to identify a specific geo-entity and/or geo-area of intent from a plurality of potential geo-entities and/or geo-areas of intent that have been geocoded from a static map image. According to aspects, an agglomerative hierarchical clustering on the geo-chain information for each locational/spatial coordinate may be performed. Geo-chain information is an entity's name, along with its parents' names. For example, one entity, the city of "San Francisco" in the San Francisco Bay Area has a geo-chain parent of the state of California, which has a parent of the United States. This chain contains information about the level of an entity (e.g., road, neighborhood, city, county, state, country).

Clusters may be created from the bottom up such that entities grouped in a "lower" level within a cluster hierarchy are more likely to correspond to a geo-area of intent. That is, if one or more geocoded entities (i.e., potential geo-entities of intent) from a static map image are clustered at the same state level (e.g., the one or more geocoded entities are clustered at the level of "state—California") a determination may be made that those entities are more likely to correspond to a geo-area of intent than geocoded entities from a static map image that are clustered at the country level (e.g., one or more geocoded entities that are clustered at the level of "country—United States"). Thus, according to examples, geo-coded entities clustered at higher levels in a geo-chain may be filtered, leaving only geo-coded entities at lower levels in a geo-chain as relating to potential geo-areas of intent.

In addition or alternative to performing geo-chain clustering agglomerative hierarchical clustering to reduce potential geo-entities and or geo-areas of intent derived from a static map image, spatial-based density clustering of potential geo-entities of intent may be performed to identify a most likely geo-area of intent for replacing a static map image with an interactive map. For example, upon identifying a plurality of potential geo-entities of intent (e.g., Oakland, Fremont, Berkeley) from a static map image, and reducing corresponding geocoded entities based on geo-chain clustering, one or more clusters containing potential geo-entities of intent may be eliminated in order to identify a most likely geo-area of intent. For example, should multiple geo-chain clusters of the same level (e.g., road level, neighborhood level, city level, county level, state level, country level) contain the same potential geo-entities of intent, spatial-based density clustering may be performed to reduce the clusters to a single cluster containing a most likely geo-area of intent. For example, if a first geo-chain cluster of level "state—ABC" (e.g., "state—California") contains: City A, City B and City C, and a second geo-chain cluster of level "state—XYZ" (e.g., "state—Texas") contains: City A, City B and City C, spatial density analysis may be performed to determine a most likely candidate relating to an original static map image.

Spatial-based density clustering and associated analysis may include performing the following steps. For a first geocoded entity in a geo-chain cluster, a determination may be made as to which two neighboring geocoded entities within that cluster are closest to it. Upon determining the two closest neighboring geocoded entities within that cluster to the first geocoded entity, a determination may be made as to the average distance separating the two closest neighboring geocoded entities to the first geocoded entity in the cluster. These steps may be repeated for each cluster having geocoded entities derived from a static map image that are clustered at the same level. After these calculations have been performed for each same-level cluster, the cluster that has the smallest average distance separating a geocoded entity from its two closest geocoded neighboring entities may be selected as a most likely candidate corresponding to a geo-area of intent for replacing the area of an original static map image with an interactive map. According to examples, a machine-learned ranking algorithm may be trained utilizing one or more signals as identified above in determining a most likely candidate relating to an original static map image.

For example, with regard to the geo-chain cluster described above of cluster level "state—ABC" a determination may be made that City B and City C are the closest in proximity to City A, determinations regarding how far City A is from City B (e.g., 100 km) and from City C (e.g., 400 km) may be made and the average of those two distances may be calculated (i.e., 250 km). Similarly, with regard to the geo-chain cluster described above of cluster level "state—XYZ" a determination may be made that City B and City C are the closest in proximity to City A, determinations regarding how far City A is from City B (e.g., 30 km) and City C (e.g., 15 km) may be made and the average of those two distances may be calculated (i.e., 22.5 km). Upon calculating the average distances for those clusters, the geo-entities of cluster level "state—ABC" may be filtered due to it having a larger average distance between City A and Cities B and C, while the geo-entities of cluster level "state—XYZ" may be selected as a most likely candidate corresponding to a geo-area of intent for replacing the area of an original static map image with an interactive map.

For some static map images, a reasonably accurate estimate of a geo-area of intent may be made solely based on identifying potential entities of geo intent from a static map image. For other static map images for which all potential entities of geo intent (even for a single cluster) are included, geo-areas of intent may be estimated that are inaccurate and much too large. For example, if a static map image contains a large text string (based on font size) that refers to a popular location that is far away from the area displayed in the static map image, that text string may not be initially filtered and, if no further steps are taken, an interactive map to replace the static image may be too large in relation to the original static map image. According to a specific example, a static map image of the San Francisco Bay Area may have a large text string and a corresponding directional arrow such as "To: Los Angeles 4" and in the case that no further operations are implemented, an interactive map to replace the San Francisco Bay Area static map image that includes not only the Bay Area, but also the greater Los Angeles area, may be generated.

One or more map viewport resizing operations may be performed to further hone a geo-area of intent in relation to a static map image to avoid replacing a static map image with an interactive map area that is too large. According to examples, the distance, in pixels, between text strings in a static map image corresponding to identified potential geo-entities of intent may be calculated. Similarly, upon geocoding those geo-entities of intent, geodesic distances between those geocoded entities may be calculated. A ratio between the geodesic distance and the pixel distance separating each text string (for the static map image) and each geocoded potential entity of intent should remain approximately constant for pairs of entities that lie within a viewport in order to produce an interactive map area that closely resembles a static map image.

According to the San Francisco Bay Area example described above, the computed ratio for pixel distances between a first text string and the "Los Angeles" text string and the geodesic distance between those entities will be much larger because the geodesic distance is significantly larger than the pixel distance. Potential geo-entities of intent (such as "Los Angeles" in this example) that produce geodesic to pixel ratios that meet or surpass a certain threshold value may be filtered prior to the generation of a replacement interactive map for a static map image such that a more accurate interactive depiction of the original static map image is provided by the replacement map.

In addition or alternative to resizing a map viewport utilizing the geodesic/pixel ratio mechanism described above, a map viewport for replacing a static map image may be sized based on operations that utilize text string to static map border distances. For example, a distance, in pixels, from each text string corresponding to an identified potential geo-entity of intent to each border of a static map image may be calculated. Based on that calculation the geodesic distance from each potential geo-entity of intent to a location corresponding to each border of the static map image may be calculated and longitude and latitude coordinates may be derived for viewport borders of an interactive map image that closely approximate the borders of the static map image.

A confidence score may be determined for each interactive map that is generated from a static map image. The confidence score may be calculated based on the likelihood that the initial static image that was inspected is a map as well as the likelihood that the mechanisms implemented in producing a replacement interactive map have resulted in a unique and accurate representation of the initial static image (i.e., the static map image). According examples, if a confidence score is above a threshold t: (1) during offline processing the static map image may be annotated with interactive map information, and (2) during online processing the interactive map and/or the annotated static map may be made available via an interactive map calling system. According to examples, a machine learned process may be utilized in processing this information and determining the confidence score.

FIG. 1 is an exemplary schematic diagram of an environment 100 for replacing a static image 104 with an interactive map 120 that approximates the geographic area depicted in the static map image 104. Environment 100 includes computing device 102 and computing device 118, which may be the same computing device or different computing devices. A static image 104 of the San Francisco Bay area is displayed on computing device 102 as accessed from an image search web site using the query "san francisco map" input through a website or browser search bar. As displayed by the image search website, the static image 104 includes text strings "San Francisco", "Berkeley", "Oakland" and "Freemont". Additionally, the text string "Map of San Francisco Bay Area, Calif." is located adjacent to and just above static image 104. Also located adjacent to, but displayed beneath static image 104, is the text string "Images of San Francisco Maps" and four additional thumbnail images (12, 13, 14, 15) are displayed beneath that text string. One of the four additional thumbnail images may be selected and upon making such a selection the static image 104 may be replaced by the selected image and/or a link to a website that hosts the image may be provided.

Environment 100 also shows map conversion context 106 which includes network 108 and image analysis and processing context 110 including server computing devices 112, 114 and 116. Although three server computing devices are depicted in image analysis and processing context 110 it should be understood that there may fewer or more than that number of server computing devices which are capable of performing the mechanisms for converting a static map image to an interactive map as described herein.

According to examples, data related to the image search website and static map image 104 may be sent to image analysis and processing context 110 and one or more of server computing devices 112, 114 and 116 via network 108. One or more of server computing device 112, 114 and 116 may inspect the static image; determine whether the static image meets a map identification threshold value; evaluate at least one signal associated with the static image; identify, based on the evaluation of the at least one signal, at least one geo-entity of intent; and replace the static image with an interactive map corresponding to one of the at least one identified geo-entities of intent.

In determining whether the static image 104 meets a map identification threshold value for being classified as a geo-entity map, machine learning may be implemented to characterize various features contained in static image 104. For example, one or more convolutional neural networks trained to detect and classify images by image type and category may be utilized to determine that static image 104 corresponds to a geo-entity map (i.e., a static map image).

Upon determining that the static image 104 meets or exceeds a threshold value for being classified as a geo-entity map one or more signals associated with the static image 104 (now classified as a static map image) may be evaluated. Text strings may be extracted from static image 104 and evaluated with optical character recognition. In addition to evaluating text strings from the static image 104, text strings contextually adjacent to the static image 104, text strings from the query that lead to the static image 104, as well as text strings from the URL located in the image search website and/or a website that contains the original static image 104, may be extracted and evaluated with optical character recognition.

Each of the text strings contained in the static image 104 ("San Francisco", "Berkeley", "Oakland" and "Fremont") may be analyzed in order to identify one or more geo-entities of intent. For example, each of the text strings contained in the static image 104, as determined by optical character recognition, may be analyzed and matched against one or more geo-entity databases and/or geo-entity search engines and determinations may be made therefrom that the extracted text strings correspond to one or more geo-entities or geo-chain cluster hierarchy types (e.g., city, county, state, province, country).

According to some examples, prior to or after matching extracted text strings from the static image 104 against one or more geo-entity databases and/or geo-entity search engines, determinations may be made regarding the relative font size of each text string as those font sizes relate to other text strings contained in the static image 104. Identification of larger fonts may indicate the importance of entities shown on a map and thresholds for relative font size may be utilized in filtering out text strings that likely correspond to smaller geo-entities. Such thresholds may be dependent on available computing resources, data transfer resources and/or time resources due to the cost of matching and/or geocoding each extracted text string against geo-entity databases and search engines.

Text strings associated with, but not part of, the static image 104 may similarly be matched against one or more geo-entity databases and/or geo-entity search engines and values/weights may be associated with those signals in relation to the likelihood that a geo-location associated with those signals correspond to a geo-entity of intent. Thus, in FIG. 1, text strings from the URL ("www.ABCimages-search.com"), text strings from the query ("san francisco map") and text strings located contextually adjacent to the static image 104 ("Map of San Francisco Bay Area, Calif." and "Images of San Francisco Maps") may be analyzed and matched against one or more geo-entity databases and/or geo-entity search engines and determinations may be made therefrom that one or more extracted text strings correspond to one or more geo-entities or geo-chain cluster types (e.g., city, county, state, province, country). Each of those signals, in addition to the text string signals that are part of the static image 104, may be weighted in identifying these entities. For example, the text strings located within static image 104 may be weighted more heavily than text strings that are located contextually adjacent to static image 104 in identifying potential geo-areas or geo-entities of intent. Similarly, repeated text strings located contextually adjacent to static image 104 (e.g., "San Francisco") may be weighted more heavily than text strings that are not repeated (e.g., "Bay Area").

Upon identifying one or more geo-entities and/or geo-areas of intent, the static image 104 may be replaced with an interactive map, such as interactive map 120, and the interactive map 120 may be displayed on a computing device such as computing device 118. Interactive map 120 may directly replace static image 104, a link may be provided to website that shows interactive map 120 and/or when a user touches on or otherwise interacts with static image 104 (e.g., by hovering a cursor over static image 104) a link may be provided to a website that hosts and displays interactive map 120.

Interactive map 120 includes interactive pane 122 which provides tools for interacting with the map area displayed in interactive map 120. Examples of interactive tools that may be implemented in interactive map 120 include zoom tools that allow a user to zoom in or out on a location, traffic tools that allow users to view traffic conditions on interactive map 120, places tools that allow users to view information about popular places encompassed by interactive map 120, and directions tools that allow users to obtain directions from their current location or other locations (e.g., utilizing geo-location data from a user's computing device) to entities encompassed by interactive map 120, among others.

Figure 2:
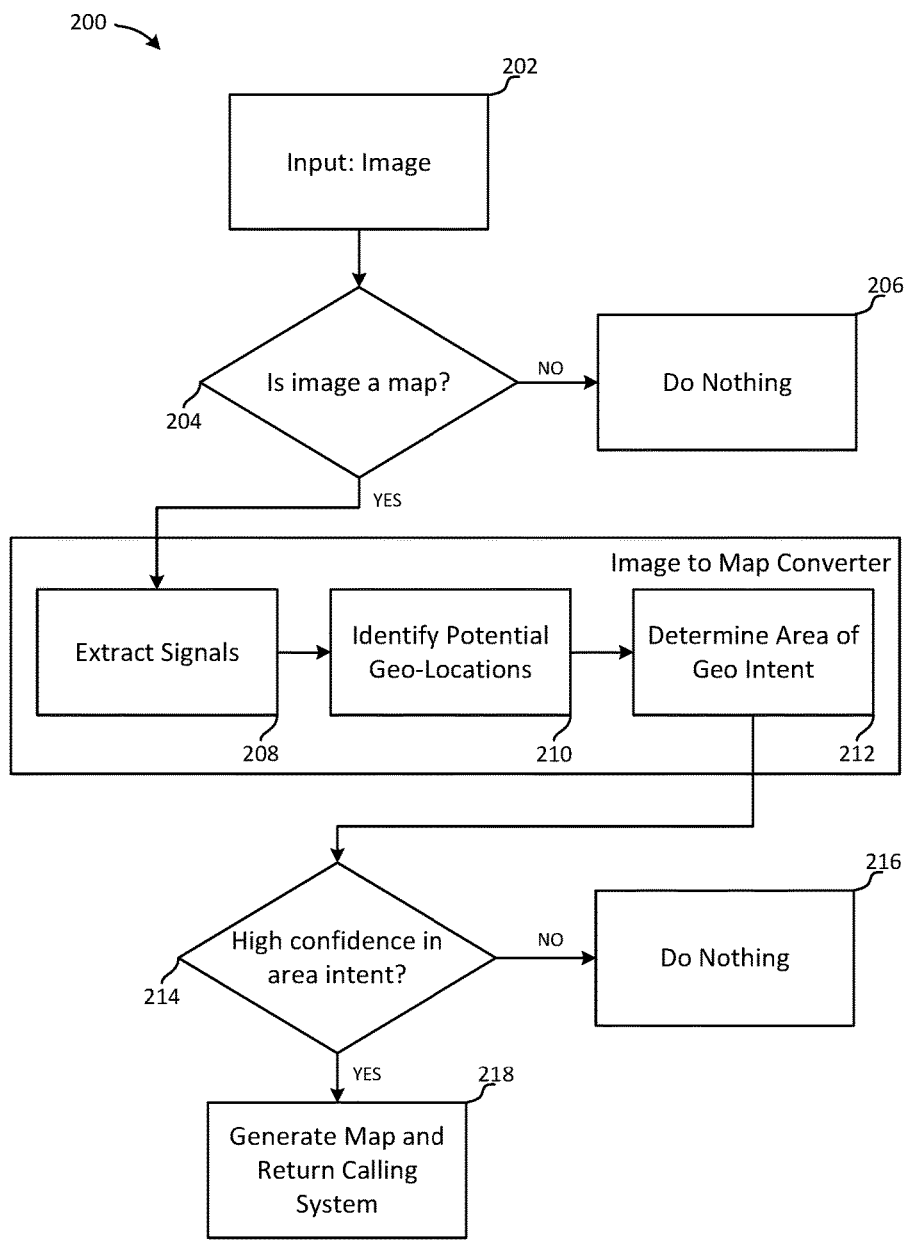
FIG. 2 illustrates an exemplary method for converting a static image into an interactive map.

FIG. 2 illustrates an example method 200 for converting a static image into an interactive map. The method starts at operation 202 where a determination is made that a static image displayed on a website or application is accessed. From operation 202 flow moves to operation 204 where a determination is made via a machine learned map classifier as to whether the image is a map. The machine learned map classifier detects whether the static image is a representation of a map. If a determination is made that the static image is not a map, then the method stops at operation 206 and a map calling system can proceed with its default behavior (e.g., redirecting the user to a source website for the image). Alternatively, if at operation 204 a determination is made that the static image is a map, flow continues to at least operations 208 through 214 where determinations that are useful in generating an interactive map corresponding to a geo-entity or geo-area of intent are made.

At operation 208 one or more signals associated with the image (now determined to be a static map image) are evaluated. Such signals may include: text strings contained in a static image determined by performing optical character recognition of a static image, font size and other emphasizing characteristics (e.g., bolding, coloring) of text strings contained in a static image, text strings related to geo-entities contained in user queries that produced a static map image, text strings related to geo-entities that are adjacent to a static map image, text strings related to geo-entities that are contained in a URL that a static map image is hosted on, and areas of focus in a static map image, among others.

From operation 208 flow continues to operation 210 where one or more potential geo-locations are identified. In identifying potential geo-locations at operation 210 candidate text strings associated with a static map image may be filtered based on their font size being smaller relative to other text strings associated with a static map image and areas of focus in a static map image may be evaluated in order to filter out signals from areas outside of the area of focus. Upon filtering one or more signals associated with a static map image, the remaining text strings may be geocoded and flow may continue to operation 212 where an area of geo intent may be determined.

In determining an area of geo-intent corresponding to a static map image at operation 212 one or more clustering mechanisms may be utilized. A geo-chain clustering mechanism may classify geo-entities from a static map image (as determined by geocoding) as belonging to tiers within a geo-chain hierarchy including categories within the hierarchy such as: road, neighborhood, city, county, state, country, etc. Clusters within a geo-chain hierarchy may be created from the bottom up such that entities grouped in a "lower" level within a cluster hierarchy are more likely to correspond to a geo-area of intent. Additionally or alternatively, spatial-based density clustering of potential geo-entities of intent may be performed to identify a most likely geo-area of intent for replacing a static map image with an interactive map. That is, upon identifying a plurality of potential geo-entities of intent from a static map image, one or more clusters containing potential geo-entities of intent may need to be eliminated in order to identify a most likely geo-area of intent. For example, should a determination be made that multiple geo-chain clusters have the same level of classification in a geo-chain hierarchy (e.g., road level, neighborhood level, city level, county level, state level, country level), spatial-based density clustering may be performed to reduce the clusters to a single cluster containing a most likely geo-area of intent. According to examples, a machine-learned ranking algorithm may be trained utilizing one or more signals as identified above in determining a most likely candidate relating to an original static map image.

Performing spatial-based density clustering and filtering at operation 212 may include one or more of the following intermediary steps. For a first geocoded entity in a geo-chain cluster, a determination may be made as to which two neighboring geocoded entities within that cluster are closest to it. Upon determining the two closest neighboring geocoded entities within that cluster to the first geocoded entity, a determination may be made as to the average distance separating the two closest neighboring geocoded entities to the first geocoded entity in the cluster. These steps may be repeated for each cluster having geocoded entities derived from a static map image that are clustered at the same hierarchical level. After these calculations have been performed for each same-level cluster, the cluster that has the smallest average distance separating a geocoded entity from its two closest geocoded neighboring entities may be selected as a most likely candidate corresponding to a geo-area of intent for replacing the area of an original static map image with an interactive map.

In determining an area of geo-intent to generate for a device's viewport at operation 212 one or more map viewport resizing mechanisms may be performed to hone the geo-area of intent in relation to a static map image to avoid replacing a static map image with an interactive map area that is too large. Thus, at operation 212, the distance, in pixels, between text strings in a static map image corresponding to identified potential geo-entities of intent may be calculated. Similarly, upon geocoding those geo-entities of intent, geodesic distances between those geocoded entities may be calculated. A ratio between the geodesic distance and the pixel distance separating each text string (for the static map image) and each geocoded potential entity of intent should remain approximately constant for pairs of entities that lie within a viewport in order to produce an interactive map area that closely resembles a static map image.

In addition or alternative to determining an area of geo-intent utilizing the geodesic/pixel ratio at operation 212 as described above, an area of geo-intent to generate and display on a device's viewport may be determined based on operations that utilize distances between text strings and static map borders. Accordingly, at operation 212 a distance, in pixels, from each text string corresponding to an identified potential geo-entity of intent to each border of a static map image may be calculated. Based on that calculation, the geodesic distance from each potential geo-entity of intent to a location corresponding to each border of the static map image may be calculated and longitude and latitude coordinates may be derived for viewport borders of an interactive image that closely approximate the borders of a static map image.

From operation 212 flow continues to operation 214. At operation 214 a determination may be made regarding how likely it is that a determined area of geo-intent corresponds to an original static map image. The confidence score may be calculated based on the likelihood that the initial static image that was inspected is a map as well as the likelihood that the mechanisms implemented in producing a replacement interactive map have resulted in a unique and accurate representation of the initial static image.

If a determination is made at operation 212, in relation to a calculated low confidence score, that a determined area of geo-intent for display as an interactive map is unlikely to correspond to an accurate representation of an initial static map image, flow continues to operation 216 where no further operations are performed and method 200 ends. Alternatively, if a determination is made at operation 212, in relation to a calculated high confidence score, that a determined area of geo-intent for display as an interactive map is likely to correspond to an accurate representation of an initial static map image, flow continues to operation 218 where an interactive map is generated. During offline processing the static map image corresponding to the generated interactive map may be annotated with interactive map information, and during online processing the interactive map and/or the annotated static map may be made available via an interactive map calling system.

Figure 3:
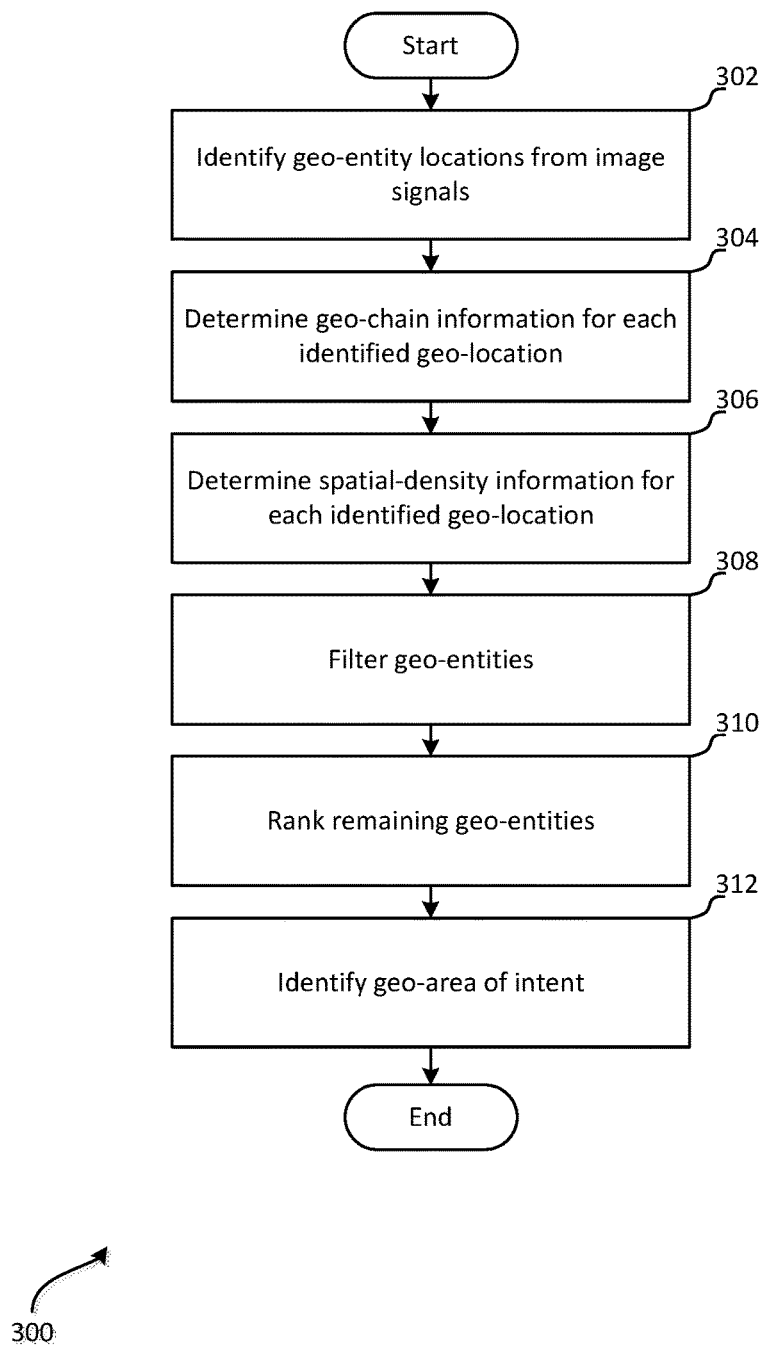
FIG. 3 illustrates an exemplary method for determining a viewport size for an interactive map to replace a static map image.

FIG. 3 illustrates an example method 300 for determining a viewport size for an interactive map to replace a static map image. The method 300 beings at a start operation and continues to operation 302 where geo-entity locations are identified based evaluation of one or more signals associated with a static map image. According to examples, such evaluation may include extracting and analyzing data associated with a static image and determining relevant text strings therefrom through optical character recognition. Evaluation may also include geocoding relevant text strings to compute location information (e.g., latitude and longitude coordinates) for one or more geographic locations corresponding to those text strings.

From operation 302 flow continues to operation 304 where geo-chain information for each identified geo-location is determined. For example, after geocoding relevant text strings at operation 302, the locational coordinates derived therefrom may be analyzed to determine whether each of the geocoded entities corresponds to one or more hierarchical location classifications (e.g., road, neighborhood city, county, state, country).

From operation 304 flow continues to operation 306 where spatial-density information for each identified geo-location is determined. Determining spatial based information for each identified geo-location may include the following steps. For a first geocoded entity in a geo-chain cluster, a determination may be made as to which two neighboring geocoded entities within that cluster are closest to it. Upon determining the two closest neighboring geocoded entities within that cluster to the first geocoded entity, a determination may be made as to the average distance separating the two closest neighboring geocoded entities to the first geocoded entity in the cluster. These steps may be repeated for each cluster having geocoded entities derived from a static map image that are clustered at the same level. After these calculations have been performed for each same-level cluster, the cluster that has the smallest average distance separating a geocoded entity from its two closest geocoded neighboring entities may be selected as a most likely candidate corresponding to a geo-area of intent for replacing the area of an original static map image with an interactive map.

From operation 306 flow continues to operation 308 where machine learning is implemented in filtering one or more geo-entities or areas associated with one or more geo-entities for replacing a static image map. Machine learning may be implemented in evaluating the geo-chain based clustering and spatial-based clustering, as well as the weights assigned to one or more signals that were evaluated in that clustering, to filter out less likely geo-areas of intent.

Upon filtering geo-entities of intent at operation 308 flow continues to operation 310 where the remaining geo-entities are ranked from most likely to least likely in identifying with a geo-entity of intent, and at operation 312 a most likely geo-area of intent is identified. From operation 312 flow continues to an end operation and the method 300 ends.

Figure 4:
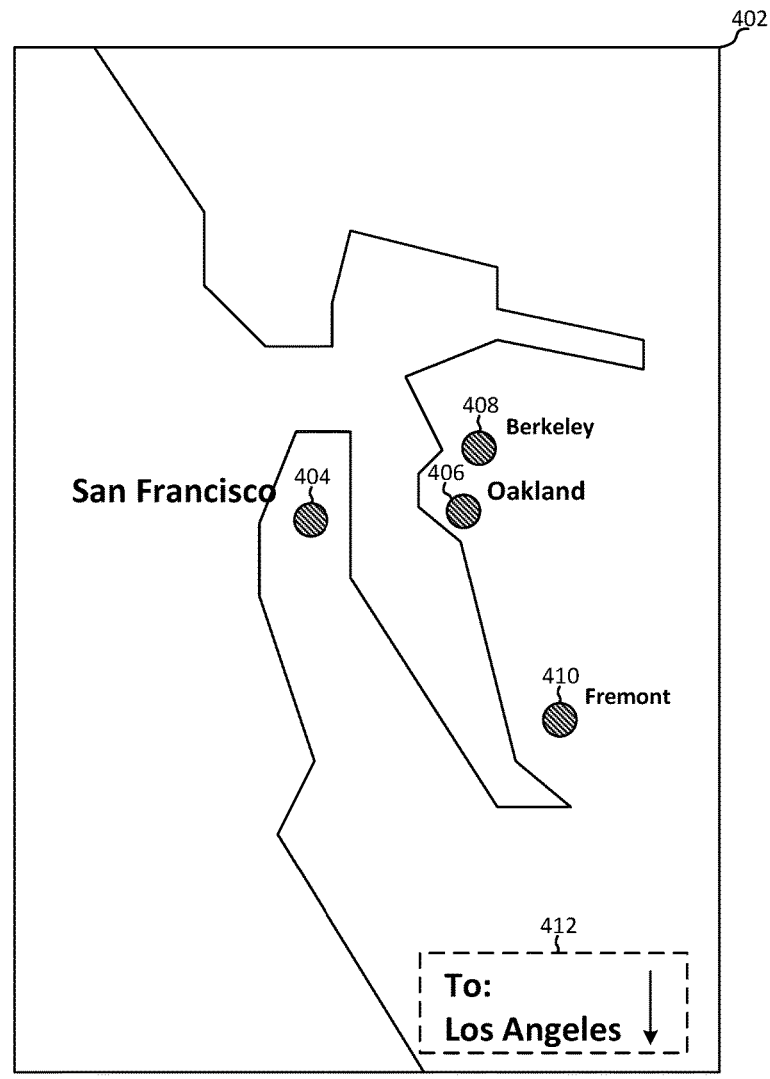
FIG. 4 illustrates an exemplary static map image of the San Francisco Bay Area for conversion into an interactive map.
Figure 4:

FIG. 4 illustrates an example static map image 400 of the San Francisco Bay Area for conversion into an interactive map. Static map image 400 may be accessed and displayed from entities such as a general website, an image search website, a map search website, mobile and PC applications, widgets, and embedded map content in those locations, among others. Included in the viewport displaying static map image 400 are text strings "San Francisco" 404 in large font (relative to the other text strings included in the static map image), "Berkeley" 408, "Oakland" 406, and "Fremont" 410, in smaller font (relative to text string "San Francisco" 404). Also included in static map image 400 is text string "To: Los Angeles" 412, located in the lower right of static map image 400. An arrow pointing south from text string "To: Los Angeles" 412 indicates that a popular location that a user may be interested in "Los Angeles" is located south of the San Francisco Bay Area. Such features are common in maps and may result in the generation of interactive maps that are too large contextually in relation to an original static map image if such text strings are not filtered out during initial filtering of text strings based on font size.

Figure 5A:
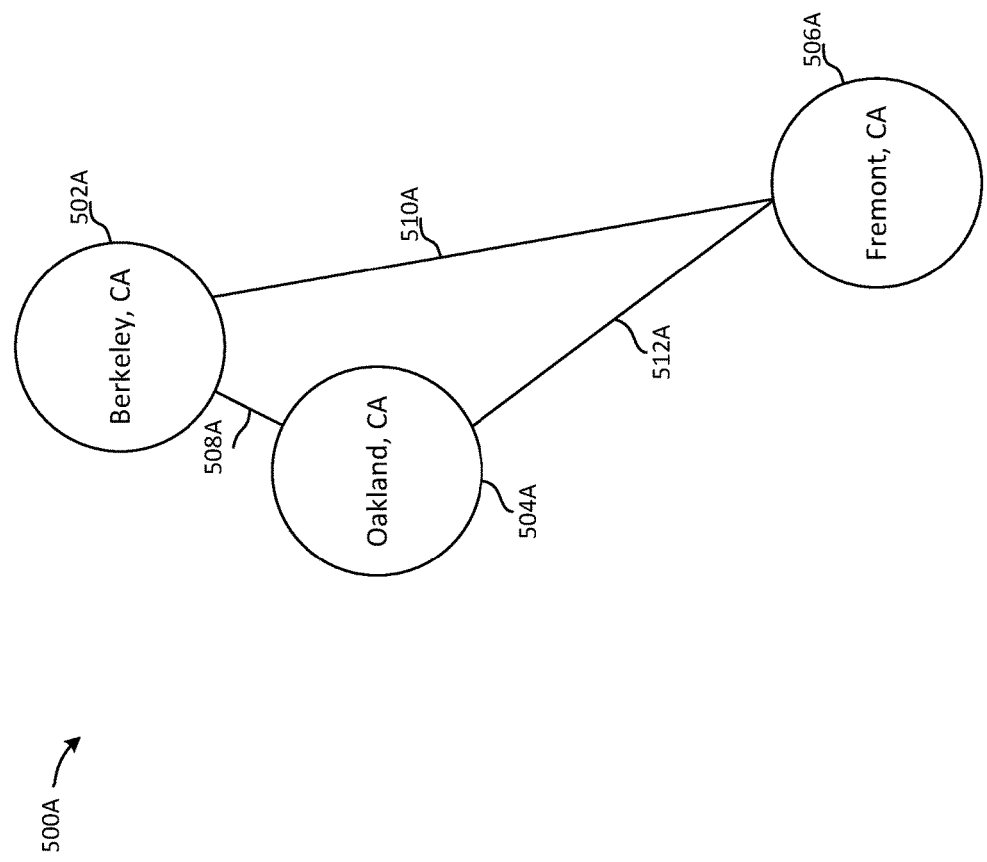
FIGS. 5A and 5B illustrate a first set of related geo-entity data points and a second set of related geo-entity data points for identifying geo-entities of intent, and subsequently a geo-area of intent, via spatial-based density clustering.
Figure 5B:
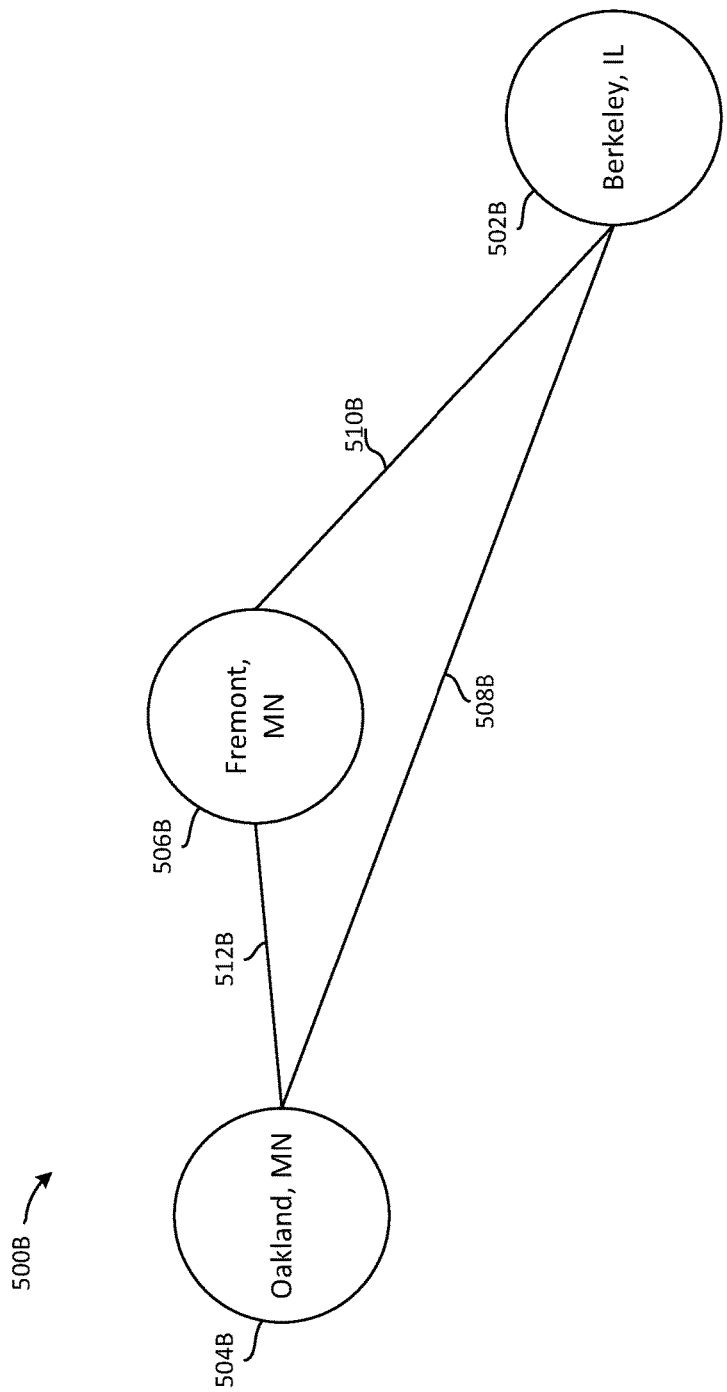

FIGS. 5A and 5B illustrate a first set of related geo-entity data points 500A and a second set of related geo-entity data points 500B for identifying geo-entities of intent, and subsequently a geo-area of intent, via spatial-based density clustering. For example, when a plurality of text strings have been extracted from a static map image, each of those text strings have been geocoded, and each of the geocoded entities have been found to correspond to more than one geo-location, geo-clustering may be implemented to determine a potential geo-area of intent corresponding to one group of geo-coded entities (e.g., a geo-area corresponding to the first set of related geo-entity data points 500A or a geo-area corresponding to the second set of related geo-entity data points 500B). In making this determination, a geo-entity from the first set of related geo-entity data points having the shortest average geodesic distance separating it from its two closest neighboring geo-entities may be calculated and a geo-area corresponding to those three geo-entities may be chosen therefrom as being the most likely geo-area of intent.

For example, potential geo-entities of intent may have been identified from a static map image, such as static map image 400, which includes the text strings of "Berkeley", "Oakland", and "Fremont". Those text stings may have been geocoded and determinations may be made that a plurality of spatial locations include each of those entities. For example, a first spatial location (i.e., a first potential geo-area of intent), may be represented by the first set of related geo-entity data points 500A, including geo-entity Berkley, Calif. 502A, Oakland, Calif. 504A and Fremont, Calif. 506A. Upon geocoding the text strings contained in the static map image containing the text strings "Berkley", "Oakland", and "Fremont", determinations may be made as to the geodesic distance separating a first geo-entity (e.g., Oakland, Calif.) from each of its two closest neighboring geo-entities (e.g., Berkeley, Calif. and Fremont, Calif.). From those determinations an average geodesic distance separating the first geo-entity (e.g., Oakland, Calif.) from each of its two closest neighboring geo-entities (e.g., Berkeley, Calif. and Fremont, Calif.) may be calculated (e.g., 26 km).

Similarly, a second spatial location (i.e., a second potential geo-area of intent), may be represented by the second set of related geo-entity data points 500B, including geo-entity Berkeley, Ill. 502B, Oakland, Minn. 504B and Fremont Minn. 506B. Upon geocoding the text strings contained in the static map image containing the text strings "Berkley", "Oakland", and "Fremont", determinations may be made as to the geodesic distance separating a first geo-entity (e.g., Oakland, Minn.) from each of its two closest neighboring geo-entities (e.g., Berkeley, Ill. and Fremont, Minn.). From those determinations an average geodesic distance separating the first geo-entity (e.g., Oakland, Minn.) from each of its two closest neighboring geo-entities (e.g., Berkeley, Ill. and Fremont, Calif.) may be calculated (e.g., 350 km). According to examples, a determination may be made that the most likely geo-area of intent corresponds to the first set of related geo-entity data points 500A since the average geodesic distance separating the first geo-entity (Oakland, Calif.) from its two closest geo-entities (Berkeley, Calif. and Fremont, Calif.) is smaller than the average geodesic distance separating the first geo-entity (Oakland, Minn.) of the second set of related geo-entity data points from its two closest geo-entities (Berkeley, Ill. and Fremont, Minn.) (26 km average geodesic distance in the first set of related geo-entity data points 500B, compared with 350 km average geodesic distance in the second set of related geo-entity data points).

Upon geocoding those geo-entities, determinations regarding their geodesic distance from one another may also be calculated and an additional calculation may be made to determine the average geodesic distance from the first geo-entity from each of its two closest neighboring geo-entities. Based on that determination, a pixel distance to geodesic distance ratio may be determined and compared against one or more potential geo-areas of intent containing the same potential geo-entities of intent (e.g., "Berkeley", "Oakland", and "Fremont"). Upon making such calculations, the potential geo-areas of intent (e.g., geo-entities of intent including the geo-entities of "Berkeley", "Oakland", and "Fremont") having the smallest average distance separating a geocoded entity from its two closest geocoded neighboring entities may be selected as a most likely candidate corresponding to a geo-area of intent for replacing the area of an original static map image with an interactive map.

For some static map images a reasonably accurate estimate of a geo-area of intent may be made solely based on identifying potential entities of geo intent from a static map image. For example, as described above with regard to the text strings of "Berkeley", "Oakland" and "Fremont", an accurate estimate of the geo-area of intent corresponding to the San Francisco Bay Area may be generated corresponding to the area depicted in FIG. 4. However, a static map image may also contain a large text string that has not been filtered from the image due to its size, which, if geocoded, may result in an inaccurate geo-area of intent due to evaluation of that text string. For example, the static map image shown in FIG. 4 contains the text string "To: Los Angeles" 412 with an arrow pointing in the direction of Los Angeles from the San Francisco Bay Area. One or more map resizing operations may be performed to further hone a geo-area of intent in relation to a static map image to avoid replacing a static map image with an interactive map area that is too large.

For example, the distance, in pixels, between the text strings in a static map image corresponding to identified potential geo-entities of intent may be calculated. Similarly, upon geocoding geo-entities of intent, geodesic distances between geocoded entities may be calculated. A ratio between the geodesic distance and the pixel distance separating each text string (for the static map image) and each geocoded potential entity of intent should remain approximately constant for pairs of entities that are within a viewport in order to generate and display an interactive map area that closely resembles a static map image.

Thus, in relation to FIG. 4, and the static map image of the San Francisco Bay Area depicted therein, the computed ratio for pixel distances between a first text string (e.g., "San Francisco" 404) and the text string "To: Los Angeles" 412 and the geodesic distance between those geo-entities will be much larger because the geodesic distance is significantly larger than the pixel distance. Upon making this determination, the text string "To: Los Angeles" 412, which has resulted in a geodesic to pixel ratio that meets or surpasses a certain threshold value, may be filtered prior to the generation of a replacement interactive map for a static map image such that a more accurate interactive depiction of the original static map image may be provided by the replacement map.

Figure 5C:
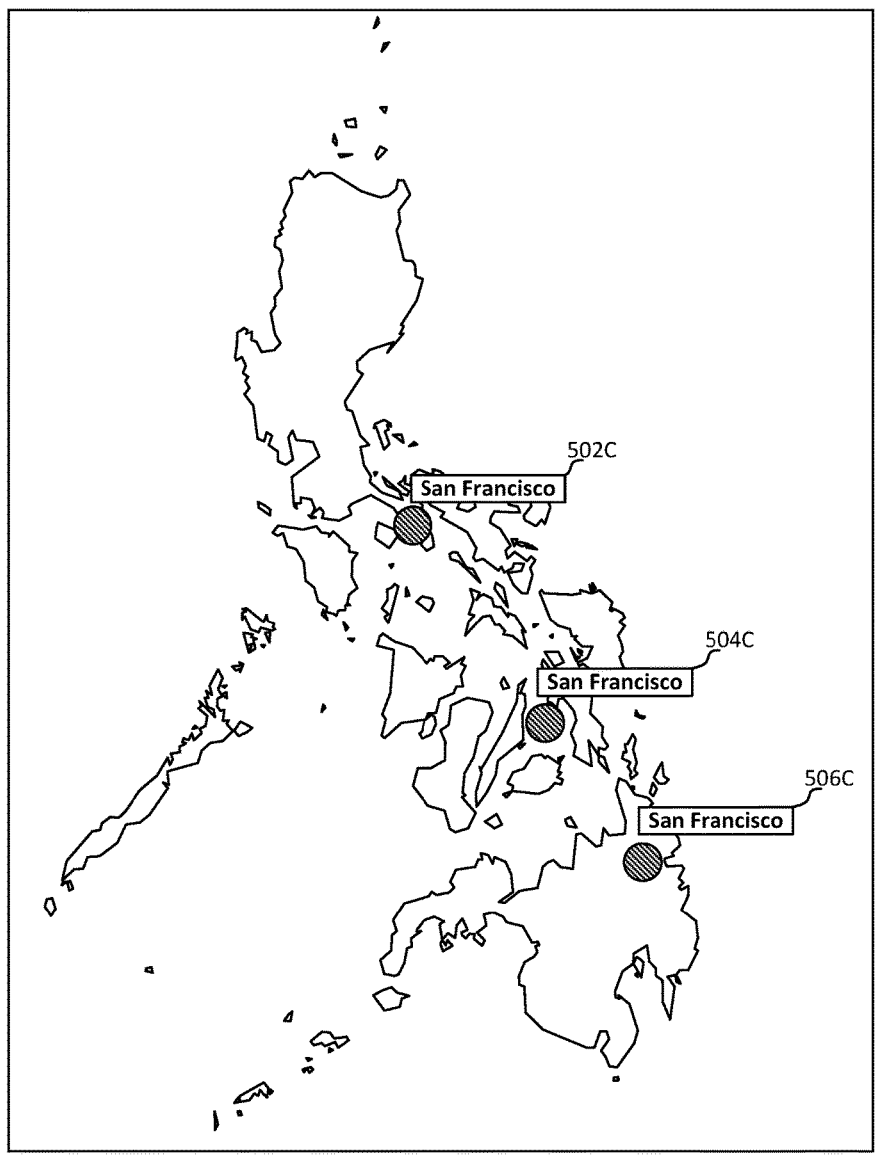
FIGS. 5C and 5D illustrate potential geo-entities of intent related to a static map image, which may be clustered and ranked to identify a most likely geo-area of intent to replace a static map image.
Figure 5D:
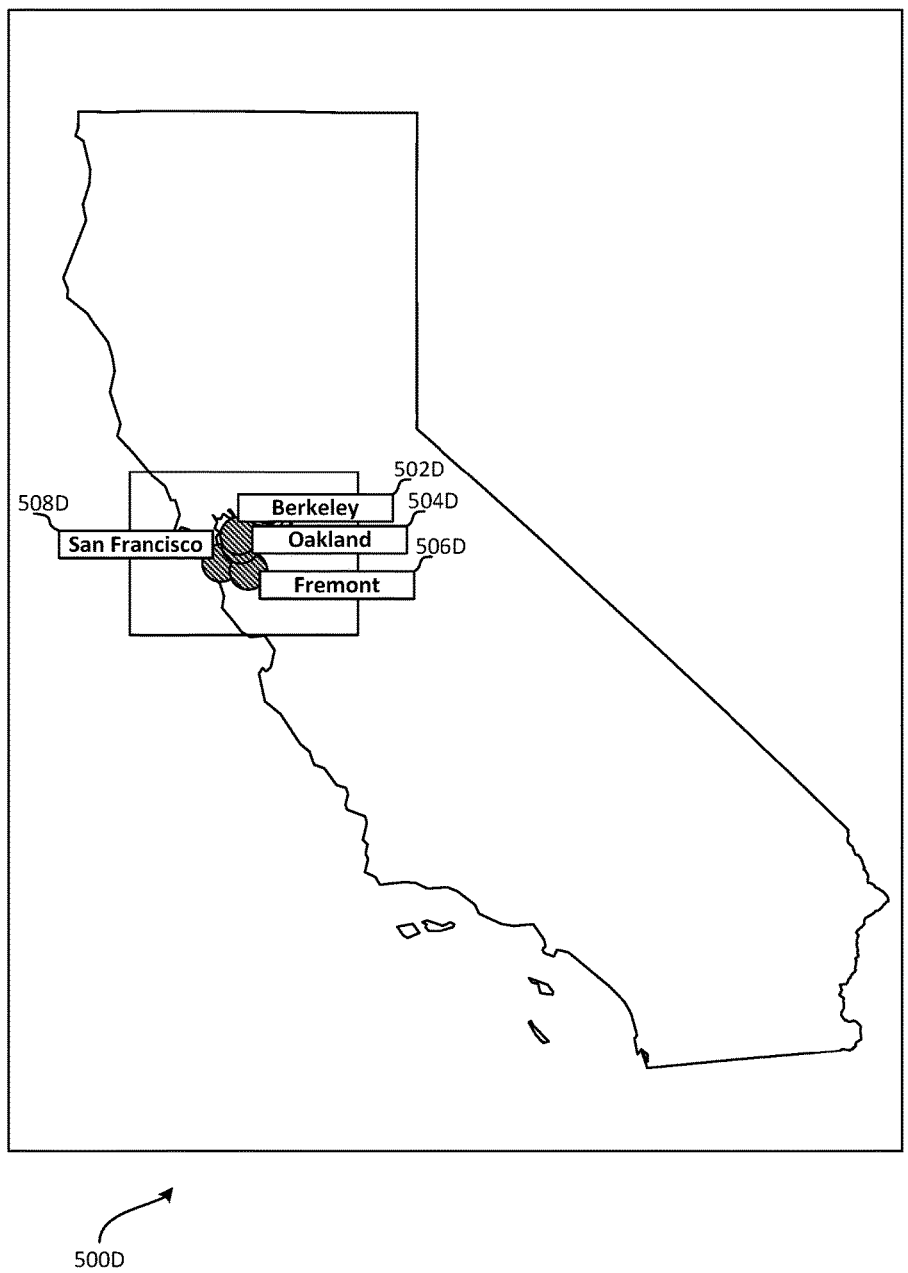

FIG. 5C and FIG. 5D illustrate potential geo-entities of intent related to a static map image, which may be grouped according to agglomerative hierarchical clustering to identify a most likely geo-area of intent to replace the static map image. According to examples, a static map image of the San Francisco Bay Area may be evaluated and one or more potential geo-entities of intent may have been identified based on one or more signals extracted from the static map image. For example, the text string "San Francisco" may have been geocoded from the static map image and a determination may be made that there are three geo-entities in the Philippines having that designation. Those geo-entities correspond to San Francisco, Quezon, Philippines 502C; San Francisco, Cebu, Philippines 504C; and San Francisco, Agusan del Sur, Philippines 506C, are shown with reference to map of Philippines 500C. Similarly, the text strings "Berkeley", "Oakland", "Fremont", and "San Francisco" may have been geocoded from the static map image and a determination may be made that there are three geo-entities in the California having that designation. Those geo-entities correspond to Berkeley, Calif., United States 502D, Oakland, Calif., United States 504D, Fremont, Calif., United States 506D and San Francisco, Calif., United States 508D, are shown with reference to map of California 500D.

According to examples, geo-chain information for each identified geo-entity may be determined and hierarchical clusters may be created from the "bottom up" for each geo-entity based on the determined geo-chain information such that entities grouped in a "lower" level within a cluster hierarchy are more likely to correspond to a geo-area of intent. Upon performing agglomerative hierarchical clustering, one or more potential geo-areas of intent may be filtered based on a determination that one or more other potential geo-areas of intent have been clustered such that at least one of their clusters include more geo-entities at a "lower" ontology cluster level in the hierarchy (i.e., the most likely potential area of geo-intent has the "lowest" ontology that includes the highest number of geo-entities).

Thus, for the identified potential geo-entities of intent in FIG. 5C, the "lowest" ontology cluster that contains each potential geo-entity of intent is "Country." That is, since each of potential geo-entities 502C, 504C and 506C reside in a separate state (Quezon, Cebu, and Agusan del Sur) within the Philippines, the lowest common ontology amongst those potential geo-entities is "Country" corresponding to the Philippines. Alternatively, for the identified potential geo-entities of intent in FIG. 5D, the "lowest" ontology cluster that contains each potential geo-entity of intent is "State." That is, since each of potential geo entities 502D, 504D, 506D and 508D reside in the same state (California), the lowest common ontology amongst those potential geo-entities is "State" corresponding to California. Therefore, because agglomerative hierarchical clustering of potential geo-entities of intent 502D, 504D, 506D and 508D results in a lower ontology cluster (State) having a higher number of potential geo-entities of intent in that lower ontology cluster (there are four geo-entities of intent clustered at ontology level "State") than for the clustered potential geo-entities of intent located in the Philippines (the lowest ontology cluster having more than one potential geo-entity of intent in map of Philippines 500C is "Country" having three potential geo-entities of intent), the potential geo-entities of intent 502C, 504C and 506C in map of the Philippines may be filtered. Thus, in this example, the most likely geo-area of intent corresponds to the potential geo-entities of intent shown in map of California 500D.

Geo-chain clustering and agglomerative hierarchical clustering to reduce and filter potential geo-entities and/or geo-areas of intent as described with regard to FIGS. 5C and 5D may be performed in addition or alternatively to spatial-based density clustering as described with regard to FIG. 5A and FIG. 5D. For example, if in performing geo-chain clustering and agglomerative hierarchical clustering to reduce and filter potential geo-entities and/or geo-areas of intent, more than one cluster corresponding to different potential geo-areas of intent are identified and clusters of the same ontology level (e.g., "State") for each of those geo-areas contain the same number of potential geo-entities of intent (e.g., four), spatial-based density clustering may be subsequently performed to determine a most likely geo-area of intent to replace an original static map image.

Figure 6:
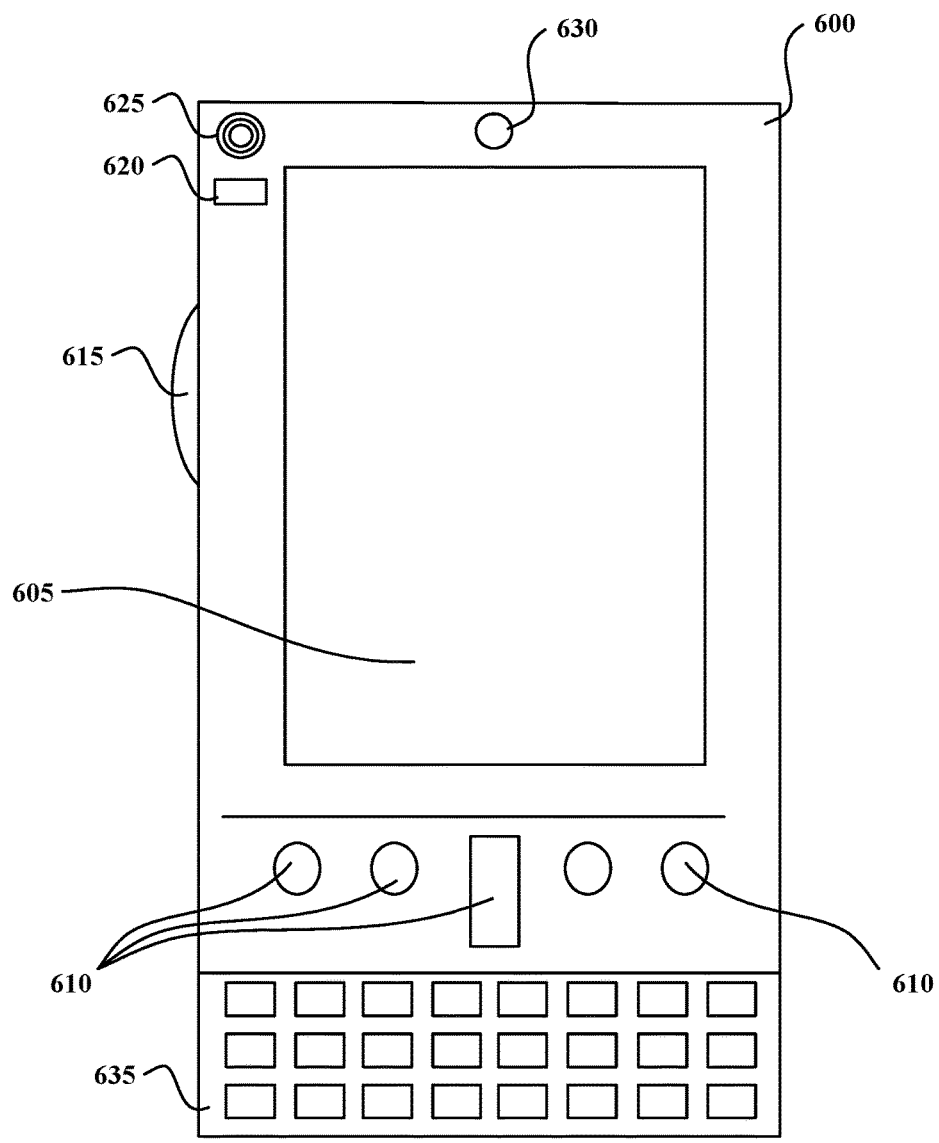
FIGS. 6 and 7 are simplified block diagrams of a mobile computing device with which aspects of the disclosure may be practiced.
Figure 7:
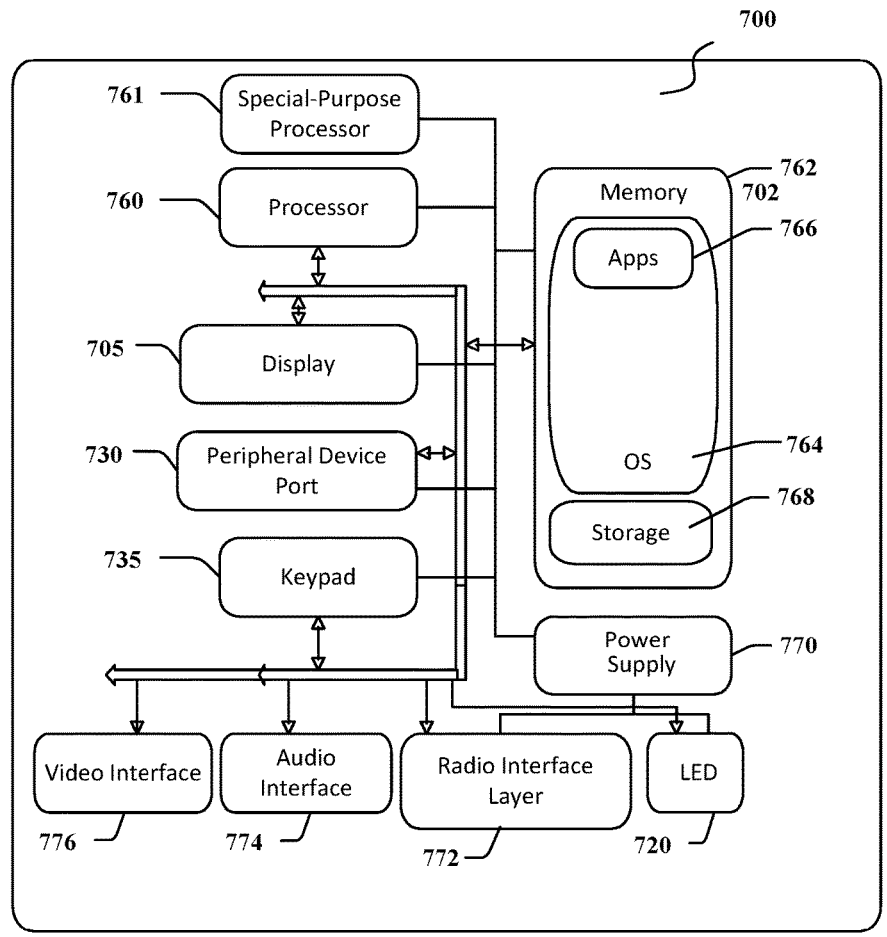

FIGS. 6 and 7 illustrate a mobile computing device 600, for example, a mobile telephone, a smart phone, wearable computer (such as a smart watch), a tablet computer, an e-reader, a laptop computer, and the like, with which embodiments of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing and operating a rules platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
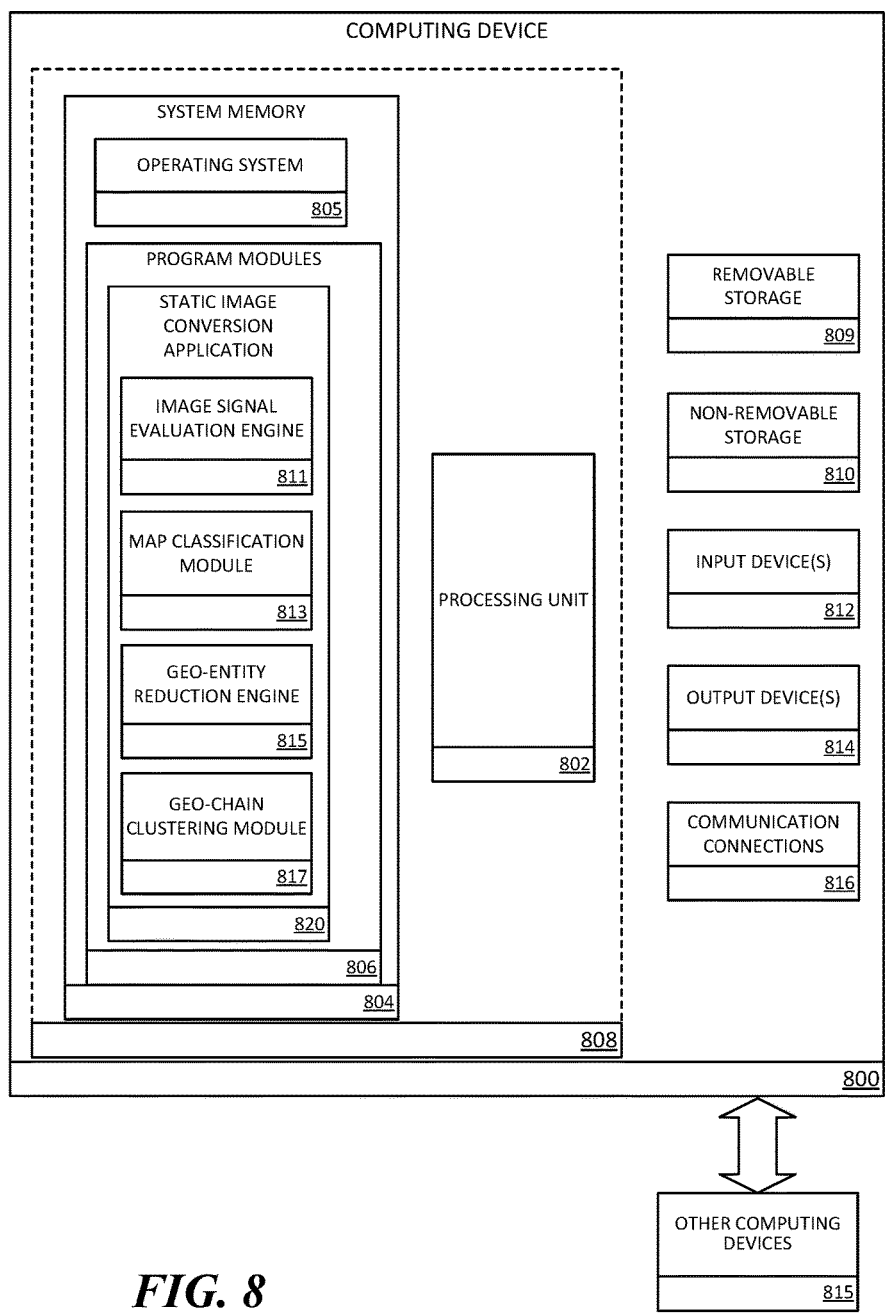
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with converting a static image into an interactive map on a computing device (e.g., server computing devices 112, 114 and 116). In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more static map conversion programs or one or more components in regards to FIG. 1. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., static image conversion application 820) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 909, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
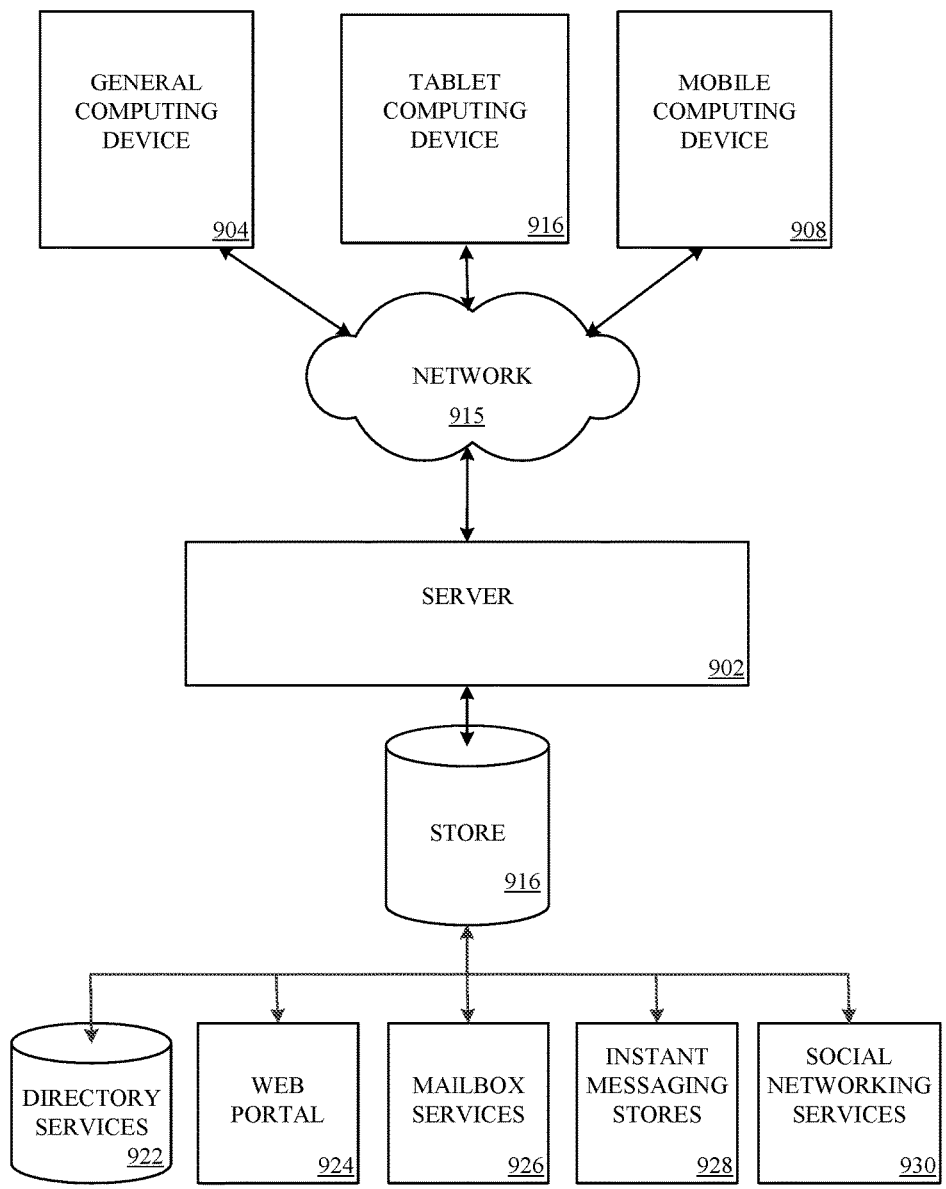
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-10 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
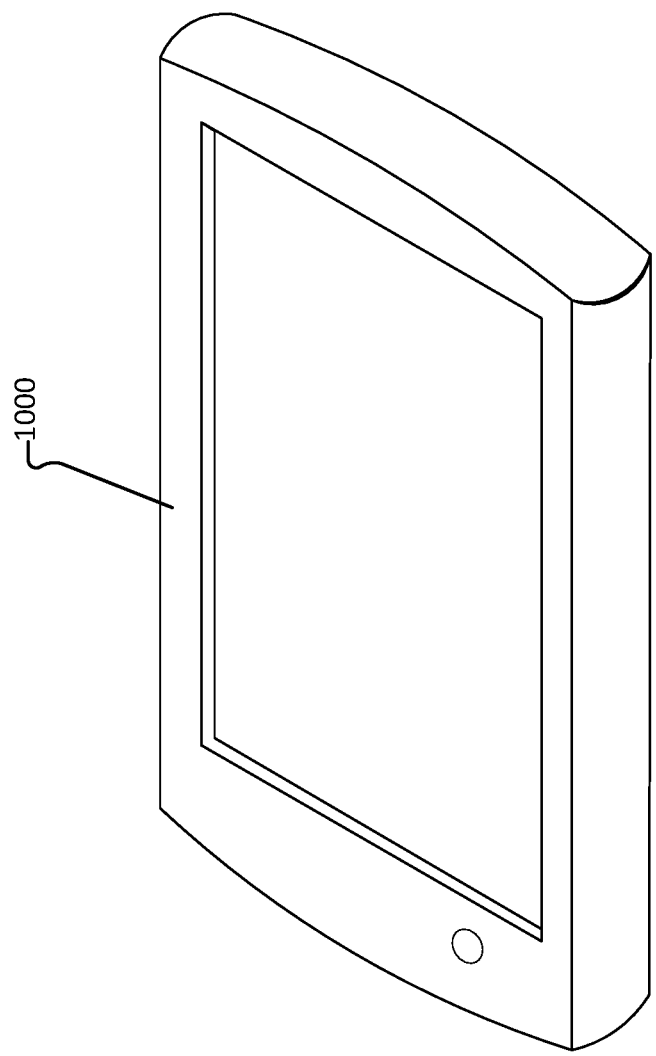
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method for converting a static image into an interactive map, comprising:
inspecting the static image to determine whether the static image meets a map identification threshold value, the map identification threshold indicating a likelihood that the static image corresponds to a geo-entity map;
extracting text from the static image and evaluating a plurality of signals associated with the static image if the static image meets the map identification threshold, at least one signal of the plurality of signals including text extracted from the static image;
identifying, based on the evaluation of the plurality of signals, a plurality of potential geo-entities of intent;
determining a geo-entity of intent, from the plurality of potential geo-entities of intent, that relates to the static image; and
replacing the static image with an interactive map corresponding to the geo-entity of intent that relates to the static image.

2. The method of claim 1, wherein the evaluation of the plurality of signals further comprises analyzing a plurality of candidate text strings determined from optical character recognition of the extracted text.

3. The method of claim 2, further comprising:
analyzing a font size of each of the candidate text strings; and
filtering out one or more of the candidate text strings determined to have a smaller font size relative to at least one other candidate text string.

4. The method of claim 2, further comprising:
evaluating a pixel distance of each of the candidate text strings relative to each of the other candidate text strings; and
determining, based on the evaluation of the pixel distance, a scale for the interactive map.

5. The method of claim 1, wherein the at least one signal includes a user image query and the identification of the plurality of potential geo-entities of intent includes determining at least one term from the user image query corresponding to a geo-entity.

6. The method of claim 1, wherein the at least one signal further includes one or more words adjacent to the static image and the identification of the plurality of potential geo-entities of intent comprises determining at least one term from the one or more words adjacent to the static image corresponding to a geo-entity.

7. The method of claim 1, wherein the at least one signal includes a URL for a webpage that the static image is embedded in and the identification of the plurality of potential geo-entities of intent comprises determining at least one term from the URL corresponding to a geo-entity.

8. The method of claim 1, wherein at least one signal of the plurality of signals includes an indication of an area of focus.

9. The method of claim 1, wherein the at least one signal of the plurality of signals comprises one of: a current user location and a determined user market for the user.

10. The method of claim 1, wherein determining at least one geo-entity of intent comprises:
identifying at least one geo-location for each of the plurality of potential geo-entities of intent;
clustering each of the plurality of potential geo-entities of intent into a geo-chain hierarchy; and
filtering, based on a machine learned ranking of the clustered potential geo-entities of intent, at least one of the potential geo-entities of intent having a lower rank in the geo-chain hierarchy than at least one other potential geo-entities of intent.

11. The method of claim 3, wherein determining at least one geo-entity of intent further comprises:
measuring, in pixels, a first distance from a first candidate text string to a second candidate text string closest to the first candidate text string;
measuring, in pixels, a second distance from the first candidate text string to a third candidate text string that is second closest to the first candidate text string;
calculating an average geodesic distance for the first and second distances; and
filtering at least one potential geo-entity of intent having a larger average geodesic distance for the first and second distances relative to at least one other potential geo-entity of intent.

12. The method of claim 3, further comprising determining a viewport size for the interactive map to replace the static image, the determining comprising:
determining a pixel distance from a first candidate text string corresponding to a first potential geo-entity of intent to a second candidate text string corresponding to second potential geo-entity of intent;
geocoding the first potential geo-entity of intent and the second potential geo-entity of intent;
determining, based on the geocoding, a geodesic distance from the first potential geo-entity of intent and the second potential geo-entity of intent;
determining that a ratio between the determined pixel distance and the determined geodesic distance exceeds a threshold value; and
adjusting the size of the interactive map for display.

13. The method of claim 11, further comprising:
measuring, in pixels, a distance from each potential geo-entity of intent of the plurality of potential geo-entities of intent to each side of the static image; and
computing, based on the measuring of the distance from each potential geo-entity of intent of the plurality of potential geo-entities of intent to each side of the static image, longitude and latitude coordinates to display for the interactive map.

14. A computer-readable storage device having computer-executable instructions, that when executed by a processor, assist with converting a static image into an interactive map, the computer-executable instructions executable by the processor for:
inspecting the static image to determine whether the static image meets a map identification threshold value, the map identification threshold indicating a likelihood that the static image corresponds to a geo-entity map;
extracting text from the static image and evaluating a plurality of signals associated with the static image if the static image meets the map identification threshold, at least one signal of the plurality of signals including text extracted from the static image;
identifying, based on the evaluation of the plurality of signals, a plurality of potential geo-entities of intent;
determining a geo-entity of intent, from the plurality of potential geo-entities of intent, that relates to the static image; and
replacing the static image with an interactive map corresponding to the geo-entity of intent that relates to the static image.

15. The computer-readable storage device of claim 14, wherein the evaluation of the plurality of signals further comprises analyzing a font size of a plurality of candidate text strings from the extracted text and filtering out at least one of the candidate text strings determined to have a smaller font size relative to at least one other candidate text string of the plurality of candidate text strings.

16. The computer-readable storage device of claim 14, wherein determining at least one geo-entity of intent comprises:
- identifying a geo-location for each of the plurality of potential geo-entities of intent;
- clustering each of the plurality of potential geo-entities of intent into a geo-chain hierarchy; and
- filtering at least one of the potential geo-entities of intent having a lower rank in the geo-chain hierarchy than at least one other potential geo-entity of intent.

17. The computer-readable storage device of claim 15, wherein determining at least one geo-entity of intent further comprises:
- measuring, in pixels, a first distance from a first candidate text string to a second candidate text string closest to the first candidate text string;
- measuring, in pixels, a second distance from the first candidate text string to a third candidate text string that is second closest to the first candidate text string;
- calculating an average geodesic distance for the first and second distances; and
- filtering at least one potential geo-entity of intent having a larger average geodesic distance for the first and second distances relative to at least one other potential geo-entity of intent.

18. A system for assisting with converting a static image into an interactive map, comprising:
- a memory for storing executable program code; and
- a processor, functionally coupled to the memory, the processor being responsive to computer-executable instructions contained in the program code and operative to:
- inspect the static image to determine whether the static image meets a map identification threshold value, the map identification threshold indicating a likelihood that the static image corresponds to a geo-entity map;
- extract text from the static image and evaluate a plurality of signals associated with the static image if the static image meets the map identification threshold, at least one signal of the plurality of signals including text extracted from the static image;
- identify, based on the evaluation of the plurality of signals, a plurality of potential geo-entities of intent, that relates to the static image; and
- replace the static image with an interactive map corresponding to the geo-entity of intent that relates to the static image.

19. The system of claim 18, wherein the evaluation of the at least one signal further comprises analyzing a font size of a plurality of candidate text strings from the extracted text and filtering at least one of the candidate text strings determined to have a smaller font size relative to at least one other candidate text string of the plurality of candidate text strings.

20. The system of claim 18, wherein determining at least one geo-entity of intent comprises:
- identifying at least one geo-location for each of the plurality of potential geo-entities of intent;
- clustering each of the plurality of potential geo-entities of intent into a geo-chain hierarchy; and
- filtering at least one of the potential geo-entities of intent having a lower rank in the geo-chain hierarchy than at least one other potential geo-entities of intent.

* * * * *